United States Patent
Goins

(10) Patent No.: US 10,328,588 B2
(45) Date of Patent: Jun. 25, 2019

(54) STEM REMOVING TOOL

(71) Applicant: Necho Goins, Tulsa, OK (US)

(72) Inventor: Necho Goins, Tulsa, OK (US)

( * ) Notice: Subject to any disclaimer, the term of this patent is extended or adjusted under 35 U.S.C. 154(b) by 0 days.

(21) Appl. No.: 15/821,887

(22) Filed: Nov. 24, 2017

(65) Prior Publication Data

US 2018/0126575 A1   May 10, 2018

Related U.S. Application Data

(63) Continuation-in-part of application No. 14/818,739, filed on Aug. 5, 2015, now abandoned.

(60) Provisional application No. 62/040,457, filed on Aug. 22, 2014.

(51) Int. Cl.
  *B26B 25/00* (2006.01)
  *A47J 21/00* (2006.01)

(52) U.S. Cl.
  CPC ............ *B26B 25/005* (2013.01); *A47J 21/00* (2013.01)

(58) Field of Classification Search
  CPC .............................. B26B 25/00; B26B 25/005
  See application file for complete search history.

(56) References Cited

U.S. PATENT DOCUMENTS

| | | | | |
|---|---|---|---|---|
| 588,477 A | * | 8/1897 | Robards | B26B 25/00 30/292 |
| 593,386 A | * | 11/1897 | Williams | B26B 9/00 30/115 |
| 1,237,826 A | | 8/1917 | Satterquist et al. | |
| 1,465,075 A | | 8/1923 | Di Carlo | |
| 2,089,881 A | * | 8/1937 | Wolfgang | A21C 11/106 30/307 |
| 2,369,452 A | * | 2/1945 | Gamache | A21C 9/068 30/142 |
| 4,502,223 A | * | 3/1985 | Brookfield | B44C 7/027 15/236.08 |
| 4,759,125 A | | 7/1988 | Olaes | |
| 4,809,437 A | | 3/1989 | Saliaris | |
| 4,858,316 A | | 8/1989 | Dubey | |
| 6,643,936 B2 | | 11/2003 | Carlson et al. | |
| 6,796,032 B2 | | 9/2004 | Horng | |
| 8,539,679 B2 | | 9/2013 | Caswell | |
| 2004/0083866 A1 | | 5/2004 | Borzym | |
| 2009/0235532 A1 | | 9/2009 | Stratford-Smith | |
| 2012/0096719 A1 | | 4/2012 | Zdroik et al. | |

* cited by examiner

*Primary Examiner* — Stephen Choi
(74) *Attorney, Agent, or Firm* — Global Intellectual Property Agency, LLC; Daniel Boudwin

(57) ABSTRACT

A stem removing tool for cutting the stems from vegetables, herbs, and the like. The stem removing tool includes a pair of elongated arms pivotally secured to one another at a common pivot point. Each arm includes a handle disposed on a first end thereof and a rotary blade disposed on a second end thereof, wherein the pair of blades are parallel to one another. The blades are able to rotate along a surface and over an object, such as the rib of a lettuce leaf, thereby removing the rib therefrom with a single use. A spring is secured between the pair of elongated arms on the second ends thereof so as to allow the blades to compress together when the handles are compressed together and spread apart when the handles are released from one another.

13 Claims, 5 Drawing Sheets

STEM REMOVING TOOL

CROSS REFERENCE TO RELATED APPLICATION

This application claims the benefit of U.S. Provisional Application No. 62/040,457 filed on Aug. 22, 2014 and U.S. Non-Provisional application Ser. No. 14/818,739 filed on Aug. 5, 2015. The above identified patent application is herein incorporated by reference in its entirety to provide continuity of disclosure.

BACKGROUND OF THE INVENTION

The present invention relates to cutting tools. More specifically, the present invention provides a stem removing tool comprising a pair of elongated arms pivotally secured to one another at a common pivot point. The arms comprise a handle on a first end thereof and a rotary blade on a second end thereof, wherein the blades are parallel to one another and adapted to rotate so as to cut objects, such as stems of vegetables and herbs, when rolled along the surface thereof. A spring is disposed between the second end of the arms so as to allow the blades to adjust in distance from one another in order to cut and remove stems having varying widths.

Many individuals do not enjoy eating the stems of herbs and leafy vegetables due to the texture and bitter taste. Therefore, an individual will remove the stems from such vegetables and herbs when cooking. Some individuals use a knife to cut the leaves or herbs off of the stem by making several cuts on both sides of the stem in order to remove the stem therefrom. However, it is time consuming to cut individual leaves off of the stem and repeat the process on the opposite side of the stem. Therefore, there exists a need in the prior art for a device that enables individuals to efficiently remove stems from leafy green vegetables, herbs, and the like.

Devices have been disclosed in the prior art that relate to cutting tools. These include devices that have been patented and published in patent application publications. These devices generally relate to hand-held cutting tools having multiple rotary blades, such as U.S. Pat. Nos. 8,539,679, 1,465,075, and U.S. Patent Application Publication Number 2012/0096719. Another device, U.S. Pat. No. 6,643,936, generally relates to a hand-held cutting tool having an adjustable rotary blade.

These prior art devices have several known drawbacks. The devices in the prior art fail to provide a stem removing tool having an elongated handle with a pair of blades on an end thereof that are arranged parallel to one another and on the same axis and are adjustably separated by a spring. Some devices include rotary cutters having multiple blades parallel to one another, however, the blades are separated at a fixed distance and are unable to adjust according to the size of the object to be cut. Another device includes a rotary blade that is adjustably secured to a handle, via a spring, in order to move between a locked and unlocked position. However, the device fails to provide a pair of rotary blades capable of cutting a strip at a single time. Thus, the prior art devices fail to disclose a stem removing tool that can be adjusted in order to cut strips of varying widths.

In light of the devices disclosed in the prior art, it is submitted that the present invention substantially diverges in design elements from the prior art and consequently it is clear that there is a need in the art for an improvement to existing stem removing tools. In this regard the instant invention substantially fulfills these needs.

SUMMARY OF THE INVENTION

In view of the foregoing disadvantages inherent in the known types of stem removing tools now present in the prior art, the present invention provides a new stem removing tool wherein the same can be utilized for providing convenience for the user when removing stems from vegetables, herbs, and the like.

It is therefore an object of the present invention to provide a new and improved stem removing tool that has all of the advantages of the prior art and none of the disadvantages.

It is another object of the present invention to provide a stem removing tool comprising a pair of elongated arms pivotally secured at a common pivot point.

Another object of the present invention is to provide a stem removing tool wherein each arm comprises a handle on a first end thereof, wherein the handles are adapted to be grasped by a user.

Yet another object of the present invention is to provide a stem removing tool wherein each arm comprises a rotary blade on a second end thereof, wherein the blades are adapted to rotate along a surface and cut objects thereunder, such as stems of leafy vegetables and herbs.

Yet another object of the present invention is to provide a stem removing tool wherein the pair of rotary blades are parallel to one another.

Yet another object of the present invention is to provide a stem removing tool further comprising a spring secured between the pair of elongated arms on the second ends thereof, wherein the spring is adapted to adjust the distance of separation of the blades.

Another object of the present invention is to provide a stem removing tool that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
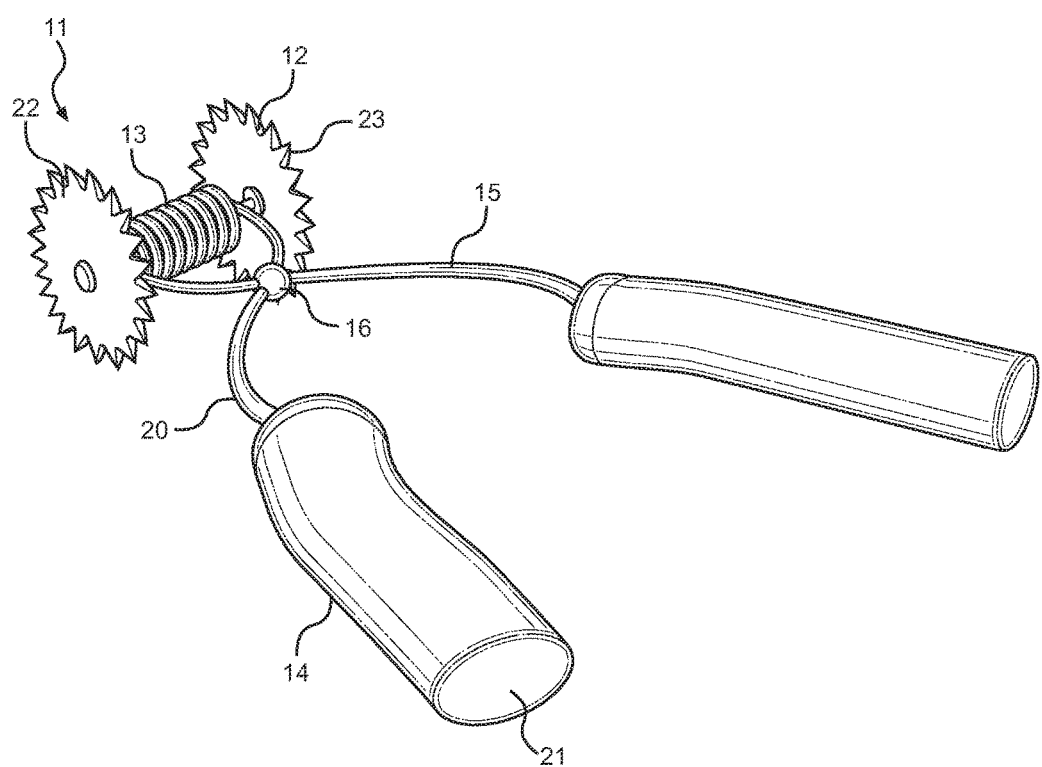
FIG. 1 shows a perspective view of an embodiment of the stem removing tool.

Reference is made herein to the attached drawings. Like reference numerals are used throughout the drawings to depict like or similar elements of the stem removing tool. For the purposes of presenting a brief and clear description of the present invention, the preferred embodiment will be discussed as used for cutting and removing stems from leafy vegetables, herbs, and the like. The figures are intended for representative purposes only and should not be considered to be limiting in any respect.

Referring now to FIG. 1, there is shown a perspective view of an embodiment of the stem removing tool. The stem removing tool 11 comprises a first elongated arm 15 pivotally secured to a second elongated arm 20 at a common pivot point 16. Each elongated arm 15, 20 comprises an elongated handle 14 on a first end 21 thereof, and a rotary blade 12 on a second end 22 thereof, wherein the handles 14 are adapted to be grasped and squeezed together by a user in order to allow the blades 12 to move closer towards one another. The pivot point 16 comprises a fastener that secures the first elongated arm 15 to the second elongated arm 20.

A first rotary blade 12 and a second rotary blade 12 are spaced apart and parallel to one another, wherein a side of the first blade 12 is facing a side of the second blade 12. Preferably, the blades 12 are circular in shape and adapted to rotate along a surface. The edges of each blade 12 are sharp so as to allow the blades 12 to cut through objects, including leafy green vegetables and herbs. In the illustrated embodiment, the edges of each blade 12 comprise a plurality of teeth 23 in order to cut through certain types of food more easily, such as lettuce. However, in alternate embodiments, the blades 12 comprise a smooth edge, or other suitable textured edge, in order to provide a desired cutting effect.

Figure 2:
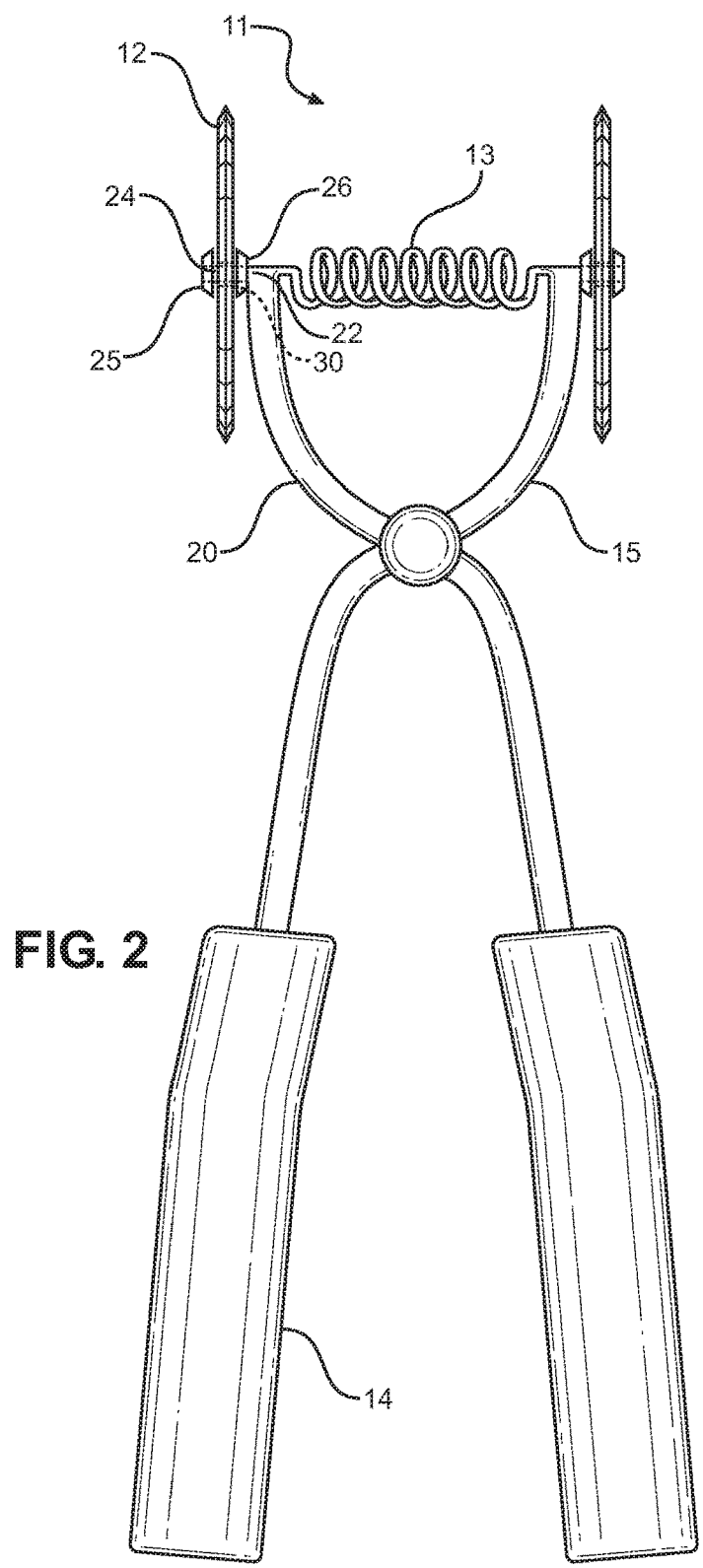
FIG. 2 shows an overhead view of an embodiment of the stem removing tool.

Referring now to FIG. 2, there is shown an overhead view of the stem removing tool. The blades 12 of the stem removing tool 11 share an axis, wherein each blade 12 further comprises an aperture 30 disposed on the center thereof adapted to receive an axle 24 therethough. The axle 24 is adapted to allow the blade 12 to rotate freely therearound so the handles 14 can be moved in a single direction, without having to lift the blades 12, in order to cut an object. In the illustrated embodiment, the axle 24 extends from the outer facing sides of each arm 15, 20 through the aperture 30. A fastener 25 is secured to the end of the axle 24 that extends through the aperture 30 to prevent the blade 12 from becoming removed therefrom. A stopper 26 is secured to the axle 24 on an opposing side of each blade 12 in relation to the fastener 25 in order to secure the blade 12 on the axle 24, such that the blade 12 remains rotatably secure between the fastener 25 and the stopper 26 on each axle 24. The outer facing side of second end 22 of each elongated arm 15, 20 is affixed to the end of each axle 24.

The stem cutting tool 11 further comprises a spring 13 that is affixed at the second end 22 of each arm 20, 15. The spring 13 extends the distance between the first arm 15 and the second arm 20 at the second end 22 thereof. The spring 13 allows a user to maintain a desired separation between the blades 12 by squeezing the handles 14 with varying force. The spring 13 further prevents the blades 12 from touching one another. In the illustrated embodiment, the spring 13 is secured between the inner facing side of the first arm 15 and the inner facing side of the second arm 20, extending the space between the blades 12. However, in alternate embodiments, the spring 13 can be disposed anywhere between the arms 15, 20 on the second side 22 thereof. In other embodiments, the spring 13 can be secured to the arms 15, 20 by any suitable fastener, such as welding the ends of the spring 13 to the arms 15, 20.

Figure 3:
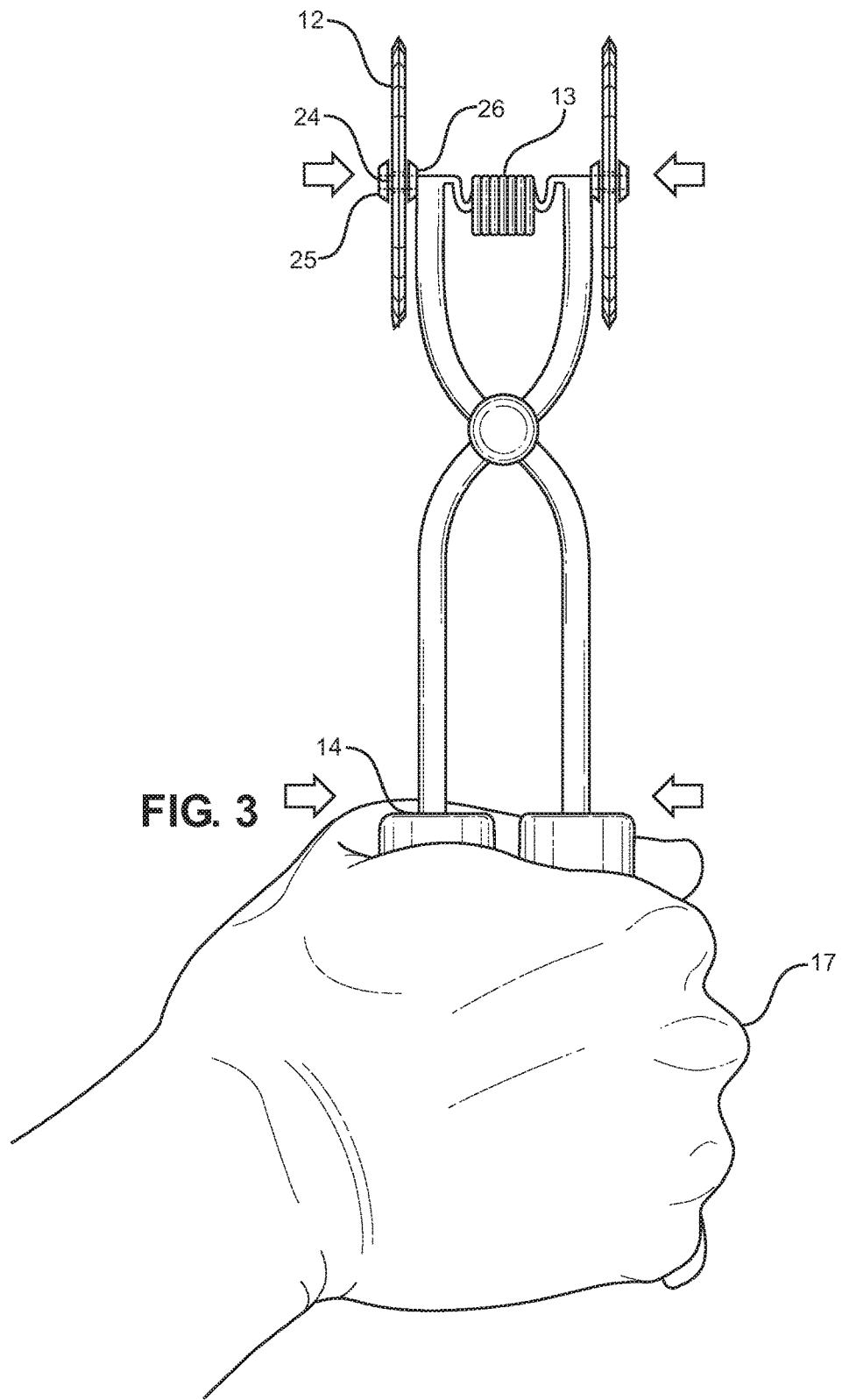
FIG. 3 shows an overhead view of an embodiment of the stem removing tool wherein the spring is in a compressed configuration.

Referring now to FIG. 3, there is shown an overhead view of an embodiment of the stem removing tool wherein the spring is in a compressed configuration. The elongated handles 14 are adapted to be squeezed towards one another by a user 17 in order to position the blades 12 closer to one another. As the handles 14 are squeezed towards one another, the spring 13 compresses, thereby allowing the blades 12 to move closer together. The fastener 25 and stopper 26 secure the blade 12 on the axle 24 wherein the blade 12 remains free to rotate. However, the spring 13 prevents the blades 12 from touching one another. For example, in some embodiments, the spring 13 is configured to allow the blades 12 to cut around stems having a thickness ranging from two inches to a thickness of a quarter inch. As the handles 14 are released, the spring 13 automatically expands and the blades 12 are moved farther apart from one another. Any suitable spring 13 can be used, such as a compression spring 13.

In some embodiments, the stem removing tool includes a locking mechanism disposed on the arms 15, 20 in order to lock the arms 15, 20 to one another so the spring 13 is prevented from expanding in order to allow the rotary blades 12 to comprise a desired space therebetween. The locking mechanism comprises a strap having a first end pivotally secured to the first elongated arm 15 and a second end having a hook thereon that can be removably secured to the second elongated arm 20. The strap is adjustable in order to allow the blades to remain positioned at varying distances apart from one another.

Figure 4:
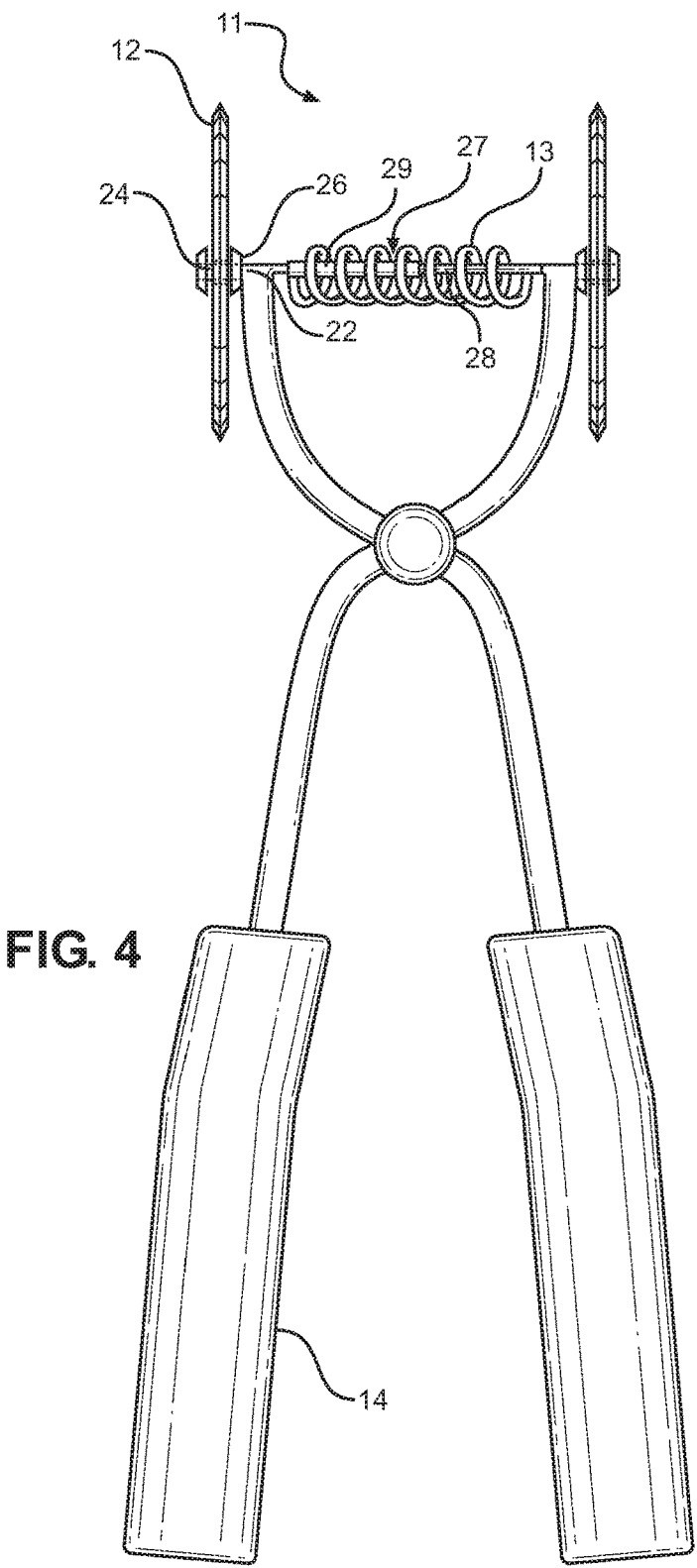
FIG. 4 shows an overhead view of an embodiment of the stem removing tool wherein an adjustable axle is disposed between the first and second rotary blades.

Referring now to FIG. 4 there is shown an overhead view of an embodiment of the stem removing tool, wherein an adjustable axle is disposed between the first and second rotary blades. In an alternative embodiment, an adjustable axle 27 is affixed between the first and second rotary blades 12 at the second end 22 within the interior of the spring 13. The adjustable axle 27 provides further stability to the stem removing tool 11 while cutting. In the illustrated embodiment, the ends of the spring 13 are affixed to a first member 28 and a second member 29 of the adjustable axle 27. However, in alternative embodiments the spring 13 may be affixed to other areas, such as to the second end 22 of each arm. The first member 28 is adapted to retract within the second member 29 when pressure is applied to each handle 14 further causing the spring 13 to compress. Compressing the spring 13 brings the blades 12 towards each other. The blades 12 remain free to rotate on their separate axle 24, wherein the stopper 26 and fastener keep them in place during any compression movement of the spring 13. When the grip pressure is released, the spring 13 expands causing the first member 28 to extend back to an extended position moving the blades 12 away from each other. The adjustable axle 27 is configured to keep the blades 12 aligned, such that when the handles 14 are squeezed together, the blades 12 remain positioned on the same axis. The adjustable axle 27 further provides stability to the device 11 when cutting.

Figure 5:
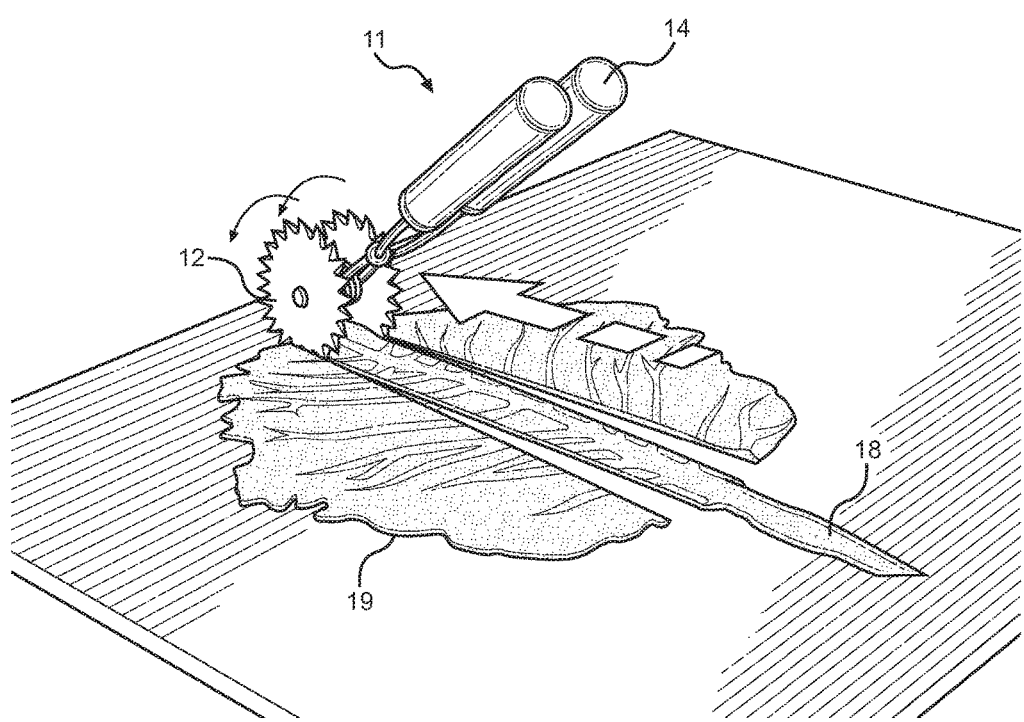
FIG. 5 shows a perspective view of an embodiment of the stem removing tool in use.

Referring now to FIG. 5, there is shown a perspective view of an embodiment of the stem removing tool in use. In operation, the stem removing device 11 is positioned so the first blade is disposed on one side of a stem 18 and the second blade 12 is disposed on an opposing side of the stem 18. The handles 14 are squeezed towards one another until the desired space between the blades 12 is achieved, wherein the user then rolls the blades 12 in a single direction along the stem 18 in order to remove the desired sides 19 of the stem 18 therefrom. The adjustable space between the blades 12 allows a user to cut along the sides of stems varying in thickness. In this way, the user is able to adjust the space in order to cut as close to the stem as possible to avoid wasting usable or edible food extending therefrom.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stem removing tool, comprising:
    a first elongated arm pivotally secured to a second elongated arm about a common pivot point;
    wherein said first elongated arm comprises a first elongated handle on a first end thereof and a first rotary blade on a second end thereof;
    wherein said second elongated arm comprises a second elongated handle on a first end thereof and a second rotary blade on a second end thereof;
    a spring secured between said second end of said first elongated arm and said second end of said second elongated arm;
    wherein a bias of said spring is configured to increase a distance between said first rotary blade and said second rotary blade, such that if said bias is overcome, said distance decreases;
    wherein a central axis of said spring is equal to a central axis of each of said first rotary blade and said second rotary blade;
    wherein said first rotary blade and said second rotary blade are parallel to one another.

2. The stem removing tool of claim 1, wherein each of said first rotary blade and said second rotary blade is circular.

3. The stem removing tool of claim 1, wherein each of said first rotary blade and said second rotary blade comprises a plurality of teeth thereon.

4. The stem removing tool of claim 1, wherein said spring is disposed between said first rotary blade and said second rotary blade.

5. The stem removing tool of claim 1, wherein an axle is connected to said first elongated arm and disposed through said first rotary blade so as to allow said first rotary blade to rotate.

6. The stem removing tool of claim 1, wherein an axle is connected to said second elongated arm and disposed through said second rotary blade so as to allow said second rotary blade to rotate.

7. The stem removing tool of claim 1, wherein said spring is a compression spring.

8. The stem removing tool of claim 1, wherein said spring has a minimum compression length whereby said minimum compression length is configured for maintaining a minimum distance of a quarter inch between said first rotary blade and said second rotary blade.

9. The stem removing tool of claim 1, wherein an adjustable axle comprising a first member and a second member is affixed between said first rotary blade and said second rotary blade within an interior of said spring, such that said adjustable axle is configured to allow each rotary blade to move toward each other when said bias is overcome.

10. A stem removing tool, comprising:
    a first elongated arm pivotally secured to a second elongated arm about a common pivot point;
    wherein said first elongated arm comprises a first elongated handle on a first end thereof and a first rotary blade rotationally affixed to a first axle on a second end thereof;
    wherein said second elongated arm comprises a second elongated handle on a first end thereof and a second rotary blade rotationally affixed to a second axle on a second end thereof;
    a spring secured between said second end of said first elongated arm and said second end of said second elongated arm;
    wherein a bias of said spring is configured to increase a distance between said first rotary blade and said second rotary blade, such that if said bias is overcome, said distance decreases;
    wherein a central axis of said spring is equal to a central axis of each of said first rotary blade and said second rotary blade;
    wherein said first rotary blade and said second rotary blade are parallel to one another.

11. The stem removing tool of claim 10, wherein an adjustable axle comprising a first member and a second member is affixed between said first rotary blade and said second rotary blade within an interior of said spring, such that said first member is configured to retract within said second member when said bias is overcome.

12. The stem removing tool of claim 11, wherein said spring has a minimum compression length whereby said minimum compression length is configured for maintaining a minimum distance of a quarter inch between said first rotary blade and said second rotary blade.

13. A stem removing tool, consisting of:
    a first elongated arm pivotally secured to a second elongated arm about a common pivot point;
    wherein said first elongated arm comprises a first elongated handle on a first end thereof and a first rotary blade rotationally affixed to a first axle on a second end thereof;
    wherein said second elongated arm comprises a second elongated handle on a first end thereof and a second rotary blade rotationally affixed to a second axle on a second end thereof;
    a compression spring secured between said first rotary blade and said second rotary blade;
    wherein a bias of said compression spring is configured to increase a distance between said first rotary blade and said second rotary blade, such that if said bias is overcome, said distance decreases;
    wherein a central axis of said compression spring is equal to a central axis of each of said first rotary blade and said second rotary blade;
    wherein said first rotary blade and said second rotary blade are parallel to one another;
    wherein each of said first rotary blade and said second rotary blade is circular and comprises a plurality of teeth thereon;
    wherein said compression spring has a minimum compression length, whereby said minimum compression length is configured to maintain a minimum distance of a quarter inch between said first rotary blade and said second rotary blade;

wherein an adjustable axle comprising a first member and a second member is affixed between said first rotary blade and said second rotary blade within an interior of said spring, such that said adjustable axle is configured to allow each rotary blade to move toward each other when said bias is overcome.

* * * * *